United States Patent Office 3,480,119
Patented Nov. 25, 1969

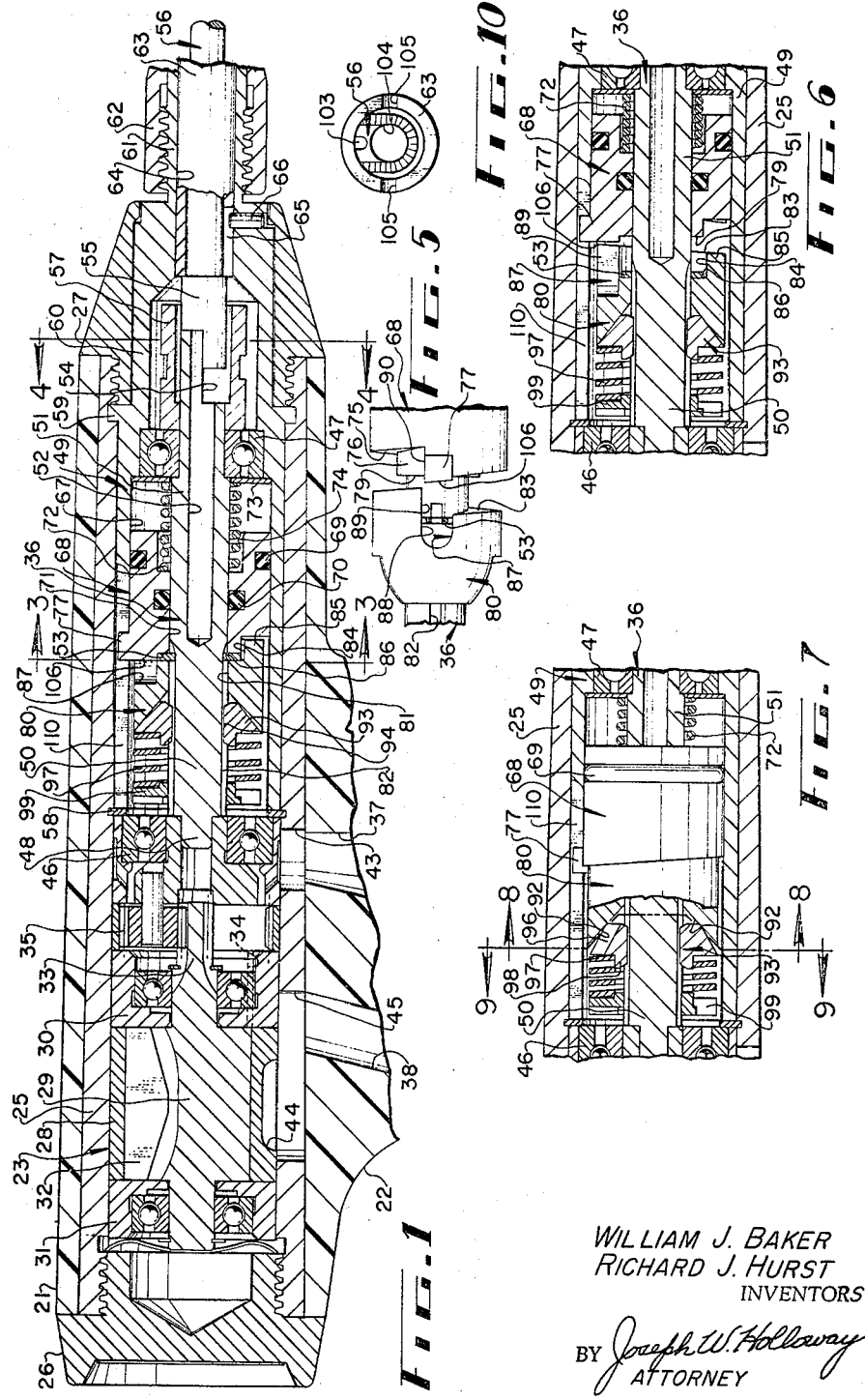

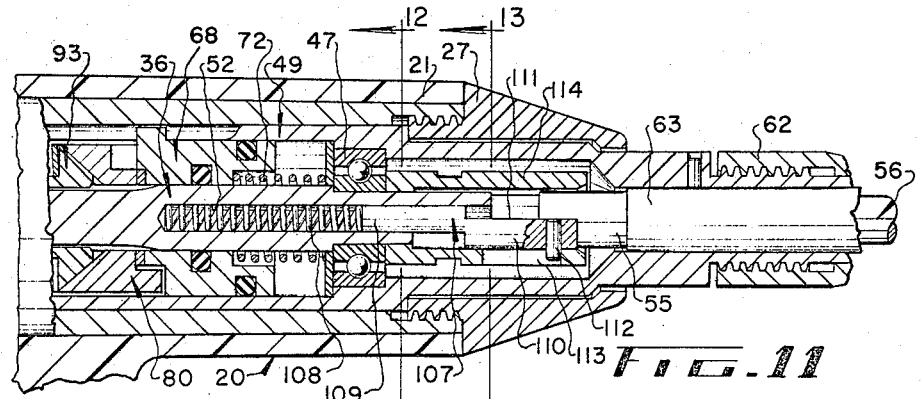
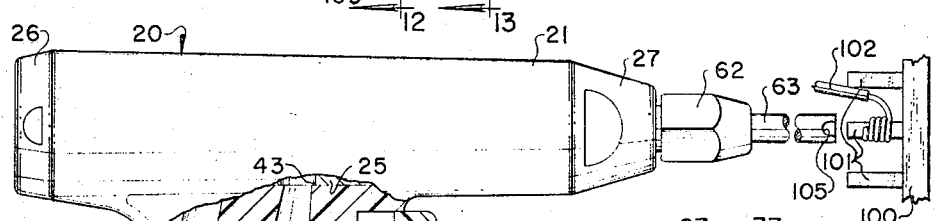
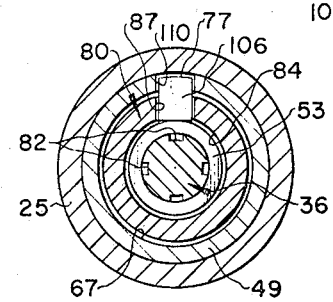
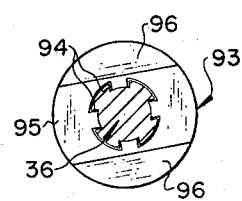
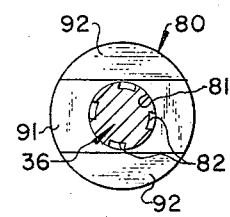
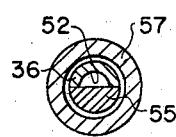
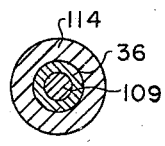
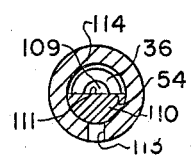

3,480,119
WIRE-WRAPPING TOOL WITH PREDETERMINED POSITION STOP
William J. Baker, Reed City, and Richard J. Hurst, Paris, Mich., assignors to Gardner-Denver Company, a corporation of Delaware
Filed Mar. 16, 1967, Ser. No. 623,611
Int. Cl. F16d *71/00, 13/54;* B65h *81/06*
U.S. Cl. 192—3                                                5 Claims

ABSTRACT OF THE DISCLOSURE

An air actuated tool for making wrapped electrical connections between a terminal and a conductor. The tool includes an air-actuated piston and a rotary index cam having engaging surfaces which are cooperable, upon deenergization of the tool, to stop the rotary tool spindle and an attached wrapping bit in a selectable angular relation with respect to the tool housing. A spring coacts with the index cam to absorb potentially damaging inertia forces resulting from rapid deceleration of the rotating tool parts, including the drive motor, as an incident to indexing the spindle and bit. The tool is convertibly adapted to provide spring loading for the bit to accommodate rearward axial thrust against the bit as the convolutions of the connection are formed by the bit.

BACKGROUND OF THE INVENTION

In the use of hand-held wire-wrapping tools of the type shown in U.S. Patent No. 3,143,307 issued to Baker, it is desirable that, following each wrapping operation, the rotating tool spindle and attached wrapping bit be stopped in a preselected angular relation with the tool housing so that the tool operator can repetitively load the wire-receiving groove in the bit face without visual assistance. Heretofore, indexing after tool deenergization has been accomplished by employing the inertia forces of various rotary tool parts to rotate the spindle against a stop member. Due to the high speed of rotary motors typically employed in wire-wrapping tools, the inertia forces developed by even small rotary tool parts are of a high order and could cause parts breakage if deceleration occurs too quickly. In U.S. Patent No. 2,649,121 issued to F. Reck, the tool motor is declutched from the spindle and bit to protect the motor and gearing; however, as a consequence, the inertia force created by the coasting motor is not available for indexing the spindle and bit. In accordance with this invention, however, the full inertia force of the deenergized air motor and its output gear mechanism are effectively employed for operating an indexing mechanism. U.S. Patent No. 2,927,741 issued to J. A. Moore et al. and U.S. Patent No. 3,156,337 issued to Olds et al. also disclose the use of motor inertia to assist in the indexing function of their respective wire-wrapping tools. However, both of these prior art tools incorporate a clutch between the tool motor and the spindle which clutch must be released upon deenergization of the motor; and, thereafter, motor inertia force for indexing is coupled to the spindle by frictionally engaging parts which slip, once the spindle is arrested, until the motor comes to a stop.

SUMMARY OF THE INVENTION

In accordance with this invention the inertia forces of rotating tool parts are employed to drive the tool spindle to an indexed position without, however, declutching the tool motor from the spindle. Instead, the buildup of inertia forces incidental to stopping the spindle in an indexed position is effectively absorbed by energy storing means included in the drive connection between the spindle and the indexing mechanism. Thus the present tool construction does not require a releasable clutch between the motor and the spindle as do Reck, Moore et al., and Olds et al. Moreover, a slippable frictional rotary drive connection of the type employed by Moore et al. and Olds et al. need not be used; consequently, it is possible to avoid undesirable heat build up in the tool and to eliminate rapid wear between the slippable parts and the need for troublesome adjustment of these parts. These and other objects and advantages will appear upon considering the following detailed description and claims in connection with the attached drawings, in which:

FIGURE 1 is a partial longitudinal section of the tool shown in FIG. 2;

FIG. 2 is a side view of a wire-wrapping tool showing a portion of the handle broken away and further showing a terminal board whereupon a wrapped connection has been completed;

FIG. 3 is a transverse section taken along lines 3—3 of FIG. 1;

FIG. 4 is a transverse section taken along lines 4—4 of FIG. 1;

FIG. 5 is a fragmentary top view of certain component parts of the tool;

FIG. 6 is a partial longitudinal section of the tool shown in FIG. 2;

FIG. 7 is a partial longitudinal section similar to FIG. 6;

FIG. 8 is a view taken along lines 8—8 of FIG. 7;

FIG. 9 is a view taken along lines 9—9 of FIG. 7;

FIG. 10 is a front view of a wrapping bit face and a sleeve shown in FIG. 1;

FIG. 11 is a partial longitudinal section showing a modified construction of the tool;

FIG. 12 is a transverse section taken along lines 12—12 of FIG. 11; and

FIG. 13 is a transverse section taken along lines 13—13 of FIG. 11.

In the drawings, an illustrative wire-wrapping tool is indicated in its entirety by numeral 20. While the present invention may be incorporated in a tool having any desired housing configuration, the tool 20 is of the pistol-grip type wherein the casing comprises a hollow, generally cylindrical barrel 21 and an integral, depending handle 22. The illustrative rotary driver for tool 20 comprises an air motor, designated in FIG. 1 by numeral 23. The barrel 21 of the tool casing has a full length bore 24 which receives and retains a sleeve 25 in which the operating mechanism of the tool 20 is housed. An end cap 26 and a nose piece 27 threadably coact with the sleeve 25 to close the ends of the barrel 21. A conventional sliding-vane air motor 23 is disposed adjacent the rear end of the barrel and comprises a cylinder 28, a rotor 29 journaled in cylinder closure plates 30 and 31, and a plurality of vanes or blades 32 against which high pressure motive air operates to rotate the rotor 29 and its integral output shaft 33. Motive air is supplied to the motor cylinder through an inlet port 34 in the front cylinder closure plate 30. A conventional planetary speed-reducing gear system, indicated in its entirety at numeral 35, serves to couple the rotor output shaft 33 to an elongated spindle 36.

As best shown in FIG. 2, the handle 22 is provided with an air inlet passage 37 and an exhaust outlet passage 38 which open at the bottom of the handle. A suitable air valve mechanism 40 is disposed in the inlet passage and is operable by a digitally depressible trigger 42 to control the supply of motive air to the motor 23. When the trigger 42 is depressed, motive air flows past the valve 40, through an aperture 43 in sleeve 25, thence rearwardly through and around the parts of the gear system 35, and into the motor cylinder 28 by means of the inlet port 34. Motor exhaust is expelled from a motor exhaust port 44, through an aperture 45 in the sleeve 25 and thence to the exterior of the tool casing by means of the handle exhaust passage 38.

The spindle 36 is rotatably journaled at its rear end by the bearing 46 and at its front end by bearing 47; and, except for a square drive extension 48, the spindle is enclosed for its full length in a stepped, cylindrical spindle housing, generally indicated by numeral 49. A rear portion 50 of the spindle 36 is provided with an external spline in the manner best shown in FIG. 3; and the front portion 51 of the spindle is provided with an axially disposed bore 52. A radially extending collar 53 is axially fixed to the spindle 36 intermediate the rear and front portions 50 and 51, respectively, for a purpose to be described. The front end of the spindle terminates in a notch 54 which provides an interfitting rotary drive connection with the tang 55 of a wire-wrapping bit, generally indicated by numeral 56. A sleeve 57 is secured by a press fit about the front end of the spindle 36 and surrounds the spindle and the notched portions of the spindle and the bit tang 55, as shown in FIG. 4.

The extreme rear end of the spindle housing 49 abuts with a retainer ring 58 axially fixed in the interior bore of the sleeve 25; and, an integrally formed flange portion 59 of the spindle housing is clamped between the sleeve 25 and the nose piece 27. A reduced diameter portion 60 of the housing 49 is surrounded by the nose piece 27; and, an exteriorly threaded nose portion 61 projects from the nose piece 27 for engagement with a collet nut 62. An elongated tubular sleeve 63 which rotatively journals the bit 56 is held axially in a bore 64 opening from the interior of the housing 42 to the front of the nose portion 61 by the collet nut 62 which compresses the nose portion radially against the exterior of the sleeve. A slot 65 in the bit sleeve cooperates with a pin 66 seated in the housing portion 60 to hold the bit sleeve in nonrotatable relation with respect to the housing 49. For a purpose to be described, the housing 49 may be freely rotated with respect to the sleeve 25 when the nose piece 27 is unscrewed from the sleeve 25 sufficiently to release the clamping pressure acting on the flange 59.

A generally cylindrical piston, indicated by numeral 68, is situated within the spindle housing bore 67 in axially shiftable relation with the housing 49 and the spindle 36. An O ring 69 carried by the piston 68 provides sealing engagement with the housing bore 67; and, an O-ring 70 provides an air seal between a central cylindrical bore 71 through the piston 68 and the outer cylindrical surface of the front portion 51 of spindle 36. With the tool 20 in the deenergized condition shown in FIG. 1, the piston 68 is yieldably biased rearwardly into abutment with the fixed collar 53 by a return spring 72 which surounds the spindle 36 and is retained between a spring plate 73 and the bottom wall of a forwardly opening recess 74 in the piston 68. As best shown in FIG. 5, the rear end face of the piston 68 is relieved to provide a spiral surface 75 which surrounds a rearwardly projecting boss 76. A lug 77 extends radially from the peripheral surface of the piston 68 and projects rearwardly beyond the end surface 79 of the boss 76 for a purpose to be described.

An index cam, generally indicated by numeral 80, is carried by the splined rear portion 50 of the spindle 36, and the cam is rotatable with respect to the spindle housing 49 and with respect to the spindle itself under certain conditions to be described. The smooth interior bore 81 of the cam is journaled on the crests of the splines 82 in the spindle 36 in the manner shown in FIG. 8. The forwardly facing end of the cam 80 is relieved to provide a spiral surface 83 which is adapted for full mating engagement with the aforedescribed spiral surface 75 on the rear end of the piston 68. The spiral surface 83 surrounds the opening of an axially disposed cavity 84 which is defined by a side wall 85 and a bottom surface 86 best shown in FIG. 6. The cavity wall 85 is provided with a slot 87 which opens to the outer periphery of the cam 80 and forwardly to the spiral surface 83. FIG. 5 shows that the wall 88 of the slot 87 defines a forwardly projecting surface 89 which is in angular alignment with a side wall 90 of the lug 77 and which, under conditions to be described, abuts with the lug side wall 90. The rear end of the cam 80 is notched, as seen in FIGS. 7 and 8 to provide a transverse bottom wall 91 and a pair of forwardly converging walls 92 intersecting with the bottom wall. As best illustrated in FIGS. 1 and 3, an elongated slot 110 opens radially from the cylindrical bore 67 of the spindle housing 49 through the housing wall and extends longitudinally from the extreme rear of the housing to approximately the midpoint of the length of the housing.

A drive block, indicated generally by numeral 93, has a central opening which is provided with splines 94 which engage with the splines 82 on the spindle 36 whereby the block is axially movable, but nonrotatable with respect to the spindle. As shown in FIGS. 7 and 9, the drive block 93 comprises a short cylindrical member having a substantially flat front wall 95 and a pair of walls 96 diverging rearwardly from the front wall 95. The front end of a compression spring 97 is carried on an annular boss 98 projecting rearwardly from the block 93. The spring 97, which is retained compressively between the block 93 and a spring plate 99 fixed to the spindle 36, yieldably urges the aforedescribed projecting front surface of the block 93 into mating engagement with the notched rear surface of the index cam 80 in the manner shown in FIGS. 1 and 6. The spring 97 also operates on the block 93 and the cam 80 to bias the cam forwardly with respect to the spindle 36 to a limiting forward position wherein the bottom surface 86 of the cavity 84 abuts with the fixed spindle collar 53.

The function of the aforedescribed tool parts is to coact to provide means for arresting rotation of the rotatable spindle 36 and bit 56 in a preset angular relationship with the nonrotatable spindle housing 49 and bit sleeve 63 each time the tool 20 is deenergized. The desirability of such rotary indexing of the bit will be better understood from a consideration of the nature of the wrapping cycle and the bit structure itself. FIG. 2 shows a typical terminal panel 100 having an electrical terminal 101 projecting therefrom with a wrapped connection completed between the terminal and a stripped end portion of an insulated wire 102. FIG. 10 shows the forward end face of the bit 56 and the surrounding sleeve 63 in properly indexed relation following completion of a wrapped connection. At the beginning of each wrapping cycle, the tool operator inserts the stripped end of a wire into an offset wire-receiving groove 103 relieved in the peripheral surface of the bit and closed by the surrounding sleeve 63. The tool 20 is then advanced toward the terminal panel 100 to insert a selected terminal into a terminal-receiving bore 104 which opens to the front face of the bit 56. The wire projecting from the groove 103 is bent back toward the tool 20 so that it is anchored in a slot 105 in the front of the sleeve 63. The tool 20 is then energized by depressing the trigger 42 whereupon the motor 23 rotates the bit 56 causing the wire to be drawn out of the groove 103 and wrapped tightly around the terminal in helical convolutions. For a detailed description of a preferred bit face configuration and the coaction of the bit 56 and the sleeve 63 with a conductor during a typical wrapping operation, reference may be had to the aforementioned U.S. Patent 3,143,307. After a connection is completed, the operator releases the trigger 42 to deenergize the tool motor 23 and thereupon loads the bit 56 with another wire. From the foregoing it will be appreciated that the operator must manually load the wire in the groove 103 and that in order to attain maximum speed and proficiency in the operation of this type of tool, the operator should be able to locate and load the groove 103 without visual assistance. Thus it is essential that the tool spindle 36 and the attached bit 56 be positively indexed after each wrapping cycle to locate the groove 103 in a preset angular position known to the operator. The manner in which this invention achieves this objective will be more fully understood from the following description of the operation of tool 20.

After the bit 56 has been loaded with a wire and applied to a terminal preparatory to the wrapping operation, the operator depresses the tool trigger 42 to permit high-pressure air to flow past the control valve 40 and to enter the interior of the cylindrical sleeve 25 through the inlet aperture 43. The flow of air into the sleeve accomplishes two results, namely, the motor 23 is energized to rotate the spindle 36 and, simultaneously, high-pressure air operates on the piston 68 to shift the same axially forwardly from the position shown in FIGS. 1 and 7 to the position shown in FIGS. 5 and 6. Referring more particularly to the operation of motor 23, motive air flows rearwardly through the speed reducing gear mechanism 35 and thence through the motor inlet port 34 to the interior of the motor cylinder 28. Expanding motive air operates on the motor blades 32 to produce rotation of the rotor 29 and the rotor output shaft 33 in a well understood manner; and, the speed reduction gear mechanism 35 drivingly couples the rotor output shaft 33 to the square drive extension 48 on the rear of the spindle 36. The drive block 93 is nonrotatably attached to the rear portion 50 of the spindle by means of mating splines 82 and 94; therefore, the block will rotate with the spindle 36. The compression spring 97 presses the drive block 93 forwardly into engagement with the rear of the index cam 80 whereby the sloped surfaces 92 and 96 of the clutch block and the index cam, respectively, matingly engage to provide a driving rotary connection therebetween.

As best shown in FIGS. 1 and 3, the lug 77 extends radially from the piston 68 and is received in the elongated slot 110 in the spindle housing 49. Because of the engagement of the lug 77 with the walls of slot 110, the piston 68 is rotatively fixed with respect to the spindle housing 49; however, the piston is movable axially between a rear limiting position shown in FIGS. 1 and 7 and a forward limiting position shown in FIGS. 5 and 6. As viewed from the front of the tool 20, the forward or wrapping rotation of the spindle 36 and the driven bit 56 is in the counterclockwise direction. It will be appreciated that rotation in the wrapping direction is impossible when the piston 68 is in its rearward limiting position as shown in FIGS. 1 and 7 due to the engagement of the side wall 90 of lug 77 with the surface 89 defined by the wall 88 of the slot 87 in the index cam 80. The spring pressure provided by the compression spring 97 is of such magnitude that the pressure engagement between the drive block 93 and the index cam 80 will not permit the motor 23 and the spindle 36 to commence rotating unless the aforedescribed interfering engagement of the surfaces 89 and 90 is first released. Such release is accomplished simultaneously with the energization of the motor 23 due to the flow of high-pressure air forwardly through the bearings 46 and the spline 82 whereby air pressure acting on the exposed rear surface of the piston 68 shifts the piston forwardly to the position shown in FIGS. 5 and 6. In the forward position of the piston, the return spring 72 is compressed and the surface 90 on the lug 77 is positioned forwardly sufficiently to disengage from the surface 89 on the index cam 80. After such forward shifting of the piston, the spindle 36 together with the block 93 and the index cam 80 are free to rotate in a counterclockwise direction thereby rotatively driving the bit 56 to apply a wire to a terminal in the manner hereinbefore described.

Upon completion of the wrapping portion of the tool cycle, the operator removes the wrapping bit 56 from the electrical terminal and releases the trigger 42 thereby closing the air inlet valve 40. Thereupon the motor 23 is deenergized and the piston 68 is biased rearwardly toward the index cam 80 by the return spring 72. The inertia forces of the rotating tool parts including the rotor 29, the speed reduction gear mechanism 35, the spindle 36 and the bit 56 tend to continue to rotate the spindle and the bit in the forward direction for a time after the motor is deenergized.

In accordance with this invention, inertia forces operable after deenergization of the driving motor 23 are employed to rotate the spindle 36 and the bit 56 to a preselected indexed position. In the indexed condition of the spindle, the spiral surfaces 75 and 83, respectively formed on the piston and the index cam are spring urged into full engagement whereby the lug surface 90 abuts with the surface 89 defined by the slot 87. Since the piston 68 is rotatively fixed with respect to the spindle housing 49, the index cam 80, when in engagement with the piston 68, is also rotatively fixed with respect to the spindle housing 49. Moreover, engagement between the surfaces 92 and 96, respectively defined by the index cam 80 and the drive block 93, prevents relative rotation between these parts; and, because of the nonrotatable relationship between the splined end 50 of the spindle 36 and the block 93, rotation of the spindle 49 is arrested with respect to the spindle housing 49 whenever the piston 68 shifts rearwardly for engagement with the index cam 80 in the manner shown in FIGS. 1 and 7. When the air pressure holding the piston 68 in the forward condition shown in FIGS. 5 and 6 is interrupted by releasing the trigger 42, the rear surface 106 of the lug 77 will move rearwardly to engage with the helical surface 83 on the index cam 80. The instantaneous relative rotary position of the index cam 80 at the time the piston shifts rearwardly will determine the initial point of contact between the spiral surface 83 and the lug surface 106. While it is possible that the slot 87 will be angularly aligned with the lug 77 thereby permitting immediate seating of the lug in the slot, it is more likely that the lug surface 106 will come to bear against the rotating helical surface 83 at some point about its perimeter remote from the slot 87. After the lug surface 106 contacts the helical surface 83 of the index cam, the aforedescribed inertial rotation of the tool mechanism will rotate the spindle 36, the bit 56 and the index cam 80 counterclockwise until the lug 77 comes into angular alignment with the slot 87. When such angular alignment is achieved, the rotating slot surface 89 will engage with the stationary lug surface 90 and thereupon the piston return spring 72 will cause the lug 77 to move rearwardly and to seat in the slot 87 in the manner shown in FIG. 1.

When the rotation of the index cam is arrested by engagement of the lug 77 in the slot 87, the rotational speed of the spindle 36, the gear mechanism 35 and the motor may still be substantial and the inertia forces brought into operation on the tool parts due to their rapid deceleration may be destructive. In order to lessen the chance of parts breakage due to such rapid build up of inertia forces, means are provided in the tool 20 to absorb a large portion of the inertial energy of the rotating parts. This means comprises the yieldable spring 97 which normally urges the drive block 93 against the index cam 80. The surfaces 92 and 96 on the index cam 80 and block 93 are momentarily caused to separate axially, in the manner shown in FIG. 7, immediately following the arrest of the index cam; and, such separation is attributable to the inertia forces built up in the block and the several other tool parts which rotate with the block. As seen in FIG. 7, such inertia forces cause the block 93 to rotate slightly with respect to the arrested index cam with the result that the surfaces 96 will cock angularly with respect to surfaces 92 and the block will be cammed axially rearwardly thereby compressing the spring 97. The inertial energy of the rotating motor 23, the gear mechanism 35, the spindle 36, and the bit 56 will be utilized to compress the spring 97 with the desirable result that the rotational arrest of these parts will be effectively cushioned. Thereafter these same parts will be driven backward slightly as the block 93 is reversely cammed by the release of the energy previously stored in the compressed spring 97; and, tfhe cocked surfaces 96 of the block will be forcibly reseated in full engagement with the surfaces 92 of the arrested index cam 80. Thus the present invention includes means for employing the inertial rotation of various tool parts as means for driving the tool spindle 49 to an indexed angular position together with a simple yet effective means for avoiding damage to tool parts due to rapid deceleration of rotating parts following indexing.

Another feature of this invention is the coaction of the spindle housing 49 and the piston 68 as a means for defining an indexed nagular home position for the spindle 36 and the attached bit 56. In this construction the spindle housing 49 may be clamped by the nose piece 27 in any desired angular orientation with respect to the tool casing. If, for example, the tool operator wished to alter the index position of the bit 56 so that the wire-receiving groove 103 appears at the bottom of the bit face, he need only loosen the nose piece 27, rotate the spindle housing 49 one hundred and eighty degrees with respect to the sleeve 25 which surrounds the housing 49, and thereafter tighten the nose piece to clamp the flange 59 against the sleeve 25.

Another feature of this invention is the provision of motive air inlet means, such as handle passage 37 and sleeve inlet aperture 43, which opens to the interior of a pneumatic tool at a point axially forwardly of the rotary motor 23 and axially rearwardly of other air actuated parts of the tool, such as the piston 68. This arrangement and location of the tool air supply provides fully pressurized air to actuate both the motor 23 and piston 68. Moreover, by providing a motor inlet port 34 in the front cylinder closure plate 30, the motor 23 may be advantageously disposed in the extreme rear end of the tool housing even though the air inlet 43 which connects the handle passage 37 to the tool interior is substantially forward of the motor 23. Oil particles are commonly entrained in the motive air supply for tools of the type presently under consideration; therefore, the tool parts disposed between the motor 23, the piston 68 and the sleeve inlet aperture 43 are assured of generous lubrication.

FIGS. 11, 12 and 13 of the drawings illustrate a modification of the aforedescribed tool mechanism wherein the bit 56 is spring loaded to prevent overwrapping or pile up of the convolutions of a wrapped connection due to improper axial withdrawal of the tool 20 and the bit 56 as the wrap is made. By means of this modification, the bit 56 is permitted to shift axially rearwardly within the sleeve as the convolutions of the connection build up on the terminal.

Referring to FIG. 11, a drive tang 107 includes a cylindrical rear portion 109 and a semicylindrical front portion 110 having a greater diameter than that of the rear portion 109. The rear portion 109 of the tang is slidably received in the forwardly opening bore 52 of the spindle 36; and, with no rearward axial pressure operating on the bit 56, the tang 107 is biased forwardly by a spring 108 in the manner shown in FIG. 11. A rotary driving connection between the tang 107 and the spindle 36 is provided by the engagement of the notch 54 in the front end of the spindle with the diametral surface 111 on the front tang portion 110. The spring 108 resiliently urges the tang 107 forwardly to a limiting axial position shown in FIG. 11 wherein a pin 112 carried adjacent the forward end of the tang portion 110 and interfitting with an axial slot 113 in the sleeve 114, abuts the forward wall of the slot. The enlarged bit tang 55 is suitably notched to engage with the diametral surface 111 to provide a rotary drive connection between the tang 107 and the bit 56. The spring biased drive tang 107 abuts axially with the bit tang 55 to yieldably maintain the bit tang 55 in axially limiting engagement with the rear annular surface of the bit sleeve 63.

Preparatory to wrapping a wire around a terminal, the operator loads the bit groove 103 with a wire and then advances the tool 20 so that a terminal is received in the bit bore 104. The operator then energizes the tool motor 23 to rotate the spindle 36 and the bit; and, as the bit 56 winds the wire to the terminal in rearwardly developing convolutions, the tool should be withdrawn from the terminal board 100 so that only a single layer of wire is applied to the terminal and pileup of convolutions is avoided. In the modification of the tool 20 as shown in FIG. 11, pileup is prevented even if the operator fails to retract the bit or retracts the bit too slowly. Thus, the bit 56 will slide axially rearwardly within the sleeve 63 in response to pressure applied to the bit face by the developing wire convolutions; and, the spring 108 will yieldably accommodate a corresponding degree of axial movement of the drive tang 107 with respect to the spindle 36. When the tool is removed from the terminal the spring 108 will bias the drive tang 107 and the bit 56 to their normal positions shown in FIG. 11.

While the present invention has been shown and described as having particular utility when employed with tool 20 in the performance of conductor wrapping operations, it will be appreciated that the invention contemplates an adjustable indexing structure which employs the inertial torque of an associated rotary driver to rotate a tool spindle to a preselectable index angular position without a subsequent release of the driving connection between the driver and the spindle.

Having fully described the invention, we claim:
1. A rotary tool comprising:
   (a) a tool casing;
   (b) a rotary motor carried by said casing;
      (1) said motor providing driving rotation when energized and inertial rotation when deenergized;
   (c) a rotary spindle journaled by said casing and drivably connected to said motor; and
   (d) means operable following deenergization of said motor for arresting inertial rotation of said motor and said spindle including:
      (1) a nonrotatable stop member connected with said casing;
      (2) a rotatable stop member carried by said rotary spindle;
      (3) said stop members being engageable to arrest rotation of said spindle and said motor;
      (4) force translating means carried on and nonrotatably connected to said spindle;
      (5) a compression spring coaxially surrounding said spindle for holding coacting surfaces on said force translating means and said rotatable stop member in yieldable engagement;
      (6) the inertia force produced by rotational arrest of said motor and said spindle causing relative rotation between said rotatable stop member and said force translating means which relative rotation is translated into linear movement of said force translating means to compress said spring.

2. The invention according to claim 1, wherein:
said force translating means and said rotatable stop member have coacting cam surfaces formed thereon.

3. A rotary tool comprising:
   (a) a tool casing;
   (b) a rotary motor carried by said casing;
      (1) said motor providing driving rotation when energized and inertial rotation when deenergized;
   (c) a rotary spindle journaled by said casing and drivably connected to said motor;
   (d) means operable following deenergization of said motor for arresting inertial rotation of said motor and said spindle including:
(1) a nonrotatable stop member connected with said casing;
(2) a rotatable stop member having a yieldable connection with said rotary spindle;
(3) said stop members being engageable to arrest rotation of said spindle and said motor;
(4) said yieldable connection including a resilient member for absorbing inertia force produced by the rotational arrest of said spindle and said motor;
(e) said casing including a housing member for said stop members;
(f) said housing member being rotatable within said casing;
(g) said nonrotatable stop member being nonrotatable with respect to said housing member; and
(h) means cooperable with said housing member and said casing for securing said housing member to said casing in innumerable angular positions.

4. A rotary tool comprising:
(a) a tool casing;
(b) a rotary motor carried by said casing;
 (1) said motor providing driving rotation when energized and inertial rotation when deenergized;
(c) a rotary spindle journaled by said casing and drivably connected to said motor; and
(d) means operable following deenergization of said motor for arresting inertial rotation of said motor and said spindle including:
 (1) a nonrotatable stop member connected with said casing;
 (2) a rotatable stop member having a yieldable connection with said rotary spindle;
 (3) said nonrotatable stop member being shiftable in opposite directions for respectively engaging and disengaging with said rotatable stop member;
 (4) said nonrotatable stop member being shiftable in the disengaging direction when said motor is energized;
 (5) the engagement of said stop members arresting rotation of said spindle and said motor; and
 (6) said yieldable connection including a resilient member for absorbing inertia force produced by the rotational arrest of said spindle and said motor.

5. The invention according to claim 4, wherein:
(a) one of said stop members is provided with a projecting lug; and
(b) the other of said stop members is provided with a slot for receiving said lug when said stop members engage and said slot and said lug become aligned.

References Cited
UNITED STATES PATENTS

| | | | |
|---|---|---|---|
| 2,685,043 | 7/1954 | Durant | 188—69 XR |
| 3,172,512 | 3/1965 | Allen et al. | 192—3 |
| 3,172,516 | 3/1965 | Moore. | |
| 3,172,517 | 3/1965 | Moore. | |
| 3,200,922 | 8/1965 | Allen. | |

MARK NEWMAN, Primary Examiner

ALLAN D. HERRMANN, Assistant Examiner

U.S. Cl. X.R.

188—69; 192—149; 242—7.17